US007928997B2

(12) United States Patent
Bastos et al.

(10) Patent No.: US 7,928,997 B2
(45) Date of Patent: Apr. 19, 2011

(54) DIGITAL IMAGE COMPOSITING USING A PROGRAMMABLE GRAPHICS PROCESSOR

(75) Inventors: Rui M. Bastos, Santa Clara, CA (US); Daniel Elliott Wexler, Soda Springs, CA (US); Larry Gritz, Berkeley, CA (US); Jonathan Rice, San Francisco, CA (US); Harold Robert Feldman Zatz, Palo Alto, CA (US); Matthew N. Papakipos, Palo Alto, CA (US); David Kirk, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/442,331

(22) Filed: May 21, 2003

(65) Prior Publication Data
US 2004/0169650 A1 Sep. 2, 2004

Related U.S. Application Data

(60) Provisional application No. 60/445,902, filed on Feb. 6, 2003.

(51) Int. Cl.
G09G 5/00 (2006.01)
G06F 15/00 (2006.01)

(52) U.S. Cl. .................................................... 345/634

(58) Field of Classification Search .......... 345/619–641, 345/506
See application file for complete search history.

(56) References Cited

U.S. PATENT DOCUMENTS

| 4,620,292 | A | | 10/1986 | Hagiwara et al. | |
|---|---|---|---|---|---|
| 5,113,357 | A | * | 5/1992 | Johnson et al. | ................ 345/424 |
| 5,666,475 | A | | 9/1997 | Salesin et al. | |
| 5,887,166 | A | | 3/1999 | Mallick et al. | |
| 5,977,977 | A | * | 11/1999 | Kajiya et al. | ................... 345/418 |
| 6,104,415 | A | * | 8/2000 | Gossett | ......................... 345/552 |
| 6,115,047 | A | | 9/2000 | Deering | |
| 6,236,413 | B1 | | 5/2001 | Gossett et al. | |
| 6,252,608 | B1 | | 6/2001 | Snyder et al. | |
| 6,275,239 | B1 | * | 8/2001 | Ezer et al. | ...................... 345/473 |
| 6,301,382 | B1 | * | 10/2001 | Smith et al. | ................... 382/162 |
| 6,313,838 | B1 | | 11/2001 | Deering | |
| 6,326,964 | B1 | | 12/2001 | Snyder et al. | |
| 6,333,743 | B1 | * | 12/2001 | Gossett et al. | ................ 345/503 |
| 6,366,316 | B1 | * | 4/2002 | Parulski et al. | ............... 348/239 |

(Continued)

OTHER PUBLICATIONS

Thompson, C.; Hahn, S.; Oskin, M. "Using Modern Graphics Architectures for General-Purpose Computing: A Framework and Analysis." Nov. 2002. Proceedings of the 35th annual ACM/IEEE international symposium on Microarchitecture.*

(Continued)

Primary Examiner — Jeffery A Brier
(74) Attorney, Agent, or Firm — Patterson & Sheridan, LLP

(57) ABSTRACT

Digital Image compositing using a programmable graphics processor is described. The programmable graphics processor supports high-precision data formats and can be programmed to complete a plurality of compositing operations in a single pass through a fragment processing pipeline within the programmable graphics processor. Source images for one or more compositing operations are stored in graphics memory, and a resulting composited image is output or stored in graphics memory. More-complex compositing operations, such as blur, warping, morphing, and the like, can be completed in multiple passes through the fragment processing pipeline. A composited image produced during a pass through the fragment processing pipeline is stored in graphics memory and is available as a source image for a subsequent pass.

25 Claims, 11 Drawing Sheets

U.S. PATENT DOCUMENTS

| | | | |
|---|---|---|---|
| 6,417,858 | B1 | 7/2002 | Bosch et al. |
| 6,456,300 | B1* | 9/2002 | Pettigrew ................. 345/634 |
| 6,559,856 | B1 | 5/2003 | Fossum et al. |
| 6,567,096 | B1* | 5/2003 | Oka et al. ................. 345/592 |
| 6,747,649 | B1 | 6/2004 | Sanz-Pastor et al. |
| 6,788,303 | B2* | 9/2004 | Baldwin ................... 345/522 |
| 6,809,739 | B2 | 10/2004 | Farinelli et al. |
| 6,825,843 | B2 | 11/2004 | Allen et al. |
| 7,015,909 | B1 | 3/2006 | Morgan, III et al. |
| 7,084,879 | B2 | 8/2006 | Sevigny |
| 2002/0130874 | A1* | 9/2002 | Baldwin ................... 345/506 |
| 2002/0145604 | A1* | 10/2002 | Yamauchi et al. ......... 345/420 |
| 2003/0001851 | A1* | 1/2003 | Bushey .................... 345/506 |
| 2003/0067473 | A1 | 4/2003 | Taylor et al. |
| 2003/0189571 | A1* | 10/2003 | MacInnis et al. .......... 345/505 |
| 2003/0222870 | A1 | 12/2003 | Driemeyer et al. |
| 2004/0042654 | A1* | 3/2004 | Sevigny ................... 382/167 |
| 2004/0051716 | A1 | 3/2004 | Sevigny |
| 2004/0128331 | A1 | 7/2004 | Hinds et al. |
| 2004/0130552 | A1* | 7/2004 | Duluk et al. .............. 345/506 |
| 2004/0179020 | A1* | 9/2004 | Lewis et al. .............. 345/582 |
| 2004/0193779 | A1 | 9/2004 | Morita et al. |

OTHER PUBLICATIONS

Zemcik, Pavel. "Hardware Acceleration of Graphics and Imaging Algorithms Using FPGAs." Apr. 2002 Procs of the 18th spring conf. on Comp. graphics, ACM; Int.l Conf. on Comp. Graphics and Interactive Techniques.*

Proudfoot, K.; Mark, W.; Tzvetkov, S.; Hanrahan, P. "A Real-Time Procedural Shading System for Programmable Graphics Hardware." ACM Siggraph 2001, 28th Ann. Proc. Int. Conf. on Comp. Graph. and Int. Tech. pp. 159-170.*

Brinkmann, Ron m. "Digital Compositing." Web book—posted Sep. 19, 1999. http://www.mlab.uiah.fi/touch/DCN/DC.html.*

International Conference on Computer Graphics and Interactive Techniques archive Proceedings of the 11th annual conference on Computer graphics and interactive techniques table of contents pp. 253-259 Year of Publication: 1984 ISSN:0097-8930 AI.*

Peercy, Mark S., Marc Alano, John Airey, and P. Jeffery Ungar, "Interactive Multi-Pass Programmable Shading", Proceedings of SIGGRAPH 2000 (New Orleans, Louisiana, Jul. 23-28, 2000). In Computer Graphics, Annual Conference Series, ACM SIGGRAPH, 2000.

Olano, Marc and Anselmo Lastra, "A Shading Language on Graphics Hardware: The PixelFlow Shading System", Proceedings of SIGGRAPH 98 (Orlando, Florida, Jul. 19-24, 1998). In Computer Graphics, Annual Conference Series, ACM SIGGRAPH, 1998.

Nvidia Corporation, "High-Precision Graphics, Studio-Quality Color on the PC," Technical Brief, Nov. 2002, 16 pages.

Nvidia Corporation, "Appendix A. Equations," Nov. 2002, pp. 1-3.

Nvidia Corporation, "NVIDIA GeForce3 Technology Preview," Feb. 2001, 29 pages, http://www.xbitlabs.com/articles/video/display/geforce3-preview.html.

* cited by examiner

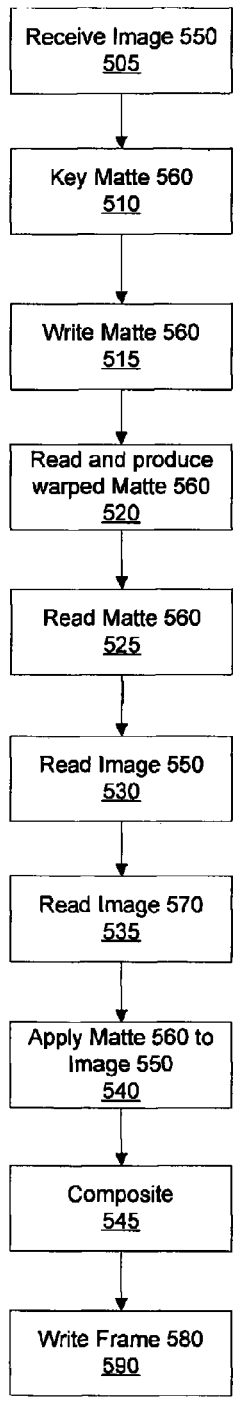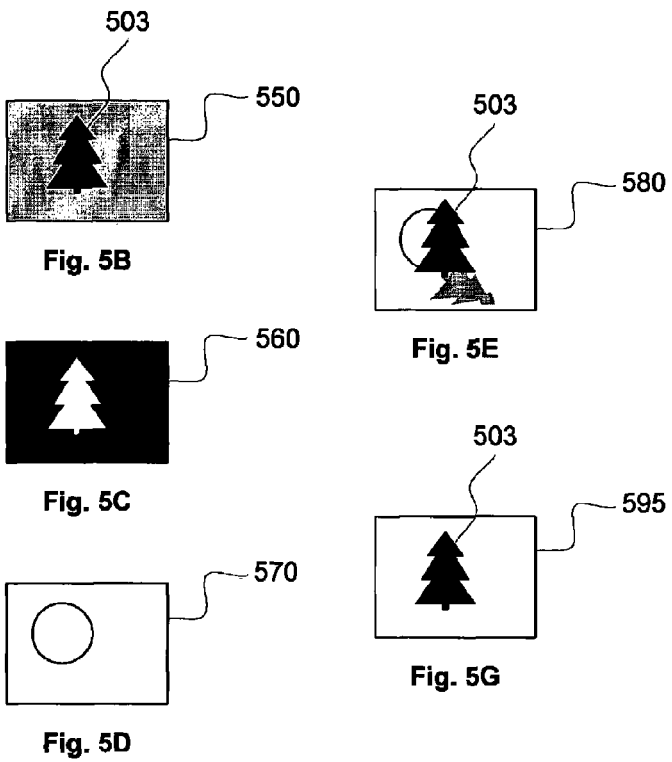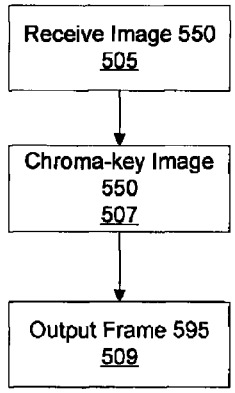

DIGITAL IMAGE COMPOSITING USING A PROGRAMMABLE GRAPHICS PROCESSOR

CROSS-REFERENCE TO RELATED APPLICATION(S)

This application claims priority from commonly owned provisional U.S. Patent Application No. 60/445,902 entitled "Digital Image Compositing Using a Programmable Graphics Processor," filed Feb. 6, 2003, having common inventors and assignee as this application, which is incorporated by reference as though fully set forth herein. This application also incorporates by reference as though fully set forth herein commonly owned co-pending U.S. patent application Ser. No. 10/302,465 entitled "Programmable Graphics System and Method Using Flexible, High-Precision Data Formats," filed Nov. 22, 2002, having a common inventor and assignee as this application.

FIELD OF THE INVENTION

The present invention relates to graphics processors, and more particularly to method and apparatus for compositing one or more images using said graphics processors.

BACKGROUND

Current graphics data processors have processing units that perform specific operations on graphics data, e.g., linear interpolation, tessellation, rasterization, texture mapping, depth testing, and the like. These graphics processors typically include several fixed-function computation units that perform specific operations. More recently, these computation units have added the ability to be programmed to perform user-specified operations.

While computation units included in each graphics processor can vary, a common element is a sampling unit that processes graphics primitives (basic geometrical constructs, such as points, lines, triangles, quadrilaterals, meshes) and generates sub-primitive data (such as pixel data or fragment data). A graphics processor uses a sampling unit and computation units to convert graphics primitives into sub-primitive data and generate image data.

Graphics processors use memory to store graphics data and program instructions, where graphics data is any data that is input to or output from the computation units within the graphics processor. Graphics memory is any memory used to store graphics data or program instructions to be executed by the graphics processor. Graphics memory can include portions of system memory, local memory directly coupled to the graphics processor, register files coupled to the computation units within the graphics processor, and the like.

"Compositing" is the technique of combining multiple source images, to build up a more-complex destination image, called the "frame". Each pixel in an image can have one or more associated matte components that describe coverage, opacity, depth, or other user-defined information. During compositing, the one or more matte components are combined using compositing operations to generate the composited frame. For example, one may desire to combine a first source image of a person in front of a blue background, with a second source image of a rendered scene. To accomplish this, the person is separated from the blue background using the "chroma-key" compositing operation, and the person is overlaid onto the second image using the "over" compositing operation. The final composited frame is an image showing the person in front of the rendered scene.

Traditionally, digital image compositing has employed general-purpose processors, due to its needs for high-precision floating-point calculations, and for programming flexibility. The use of graphics processors has typically been limited to generating individual source image elements for the final composite, by rendering three-dimensional geometry data. Digital image compositing has also employed dedicated hardware designed specifically for compositing, whose functions are limited to compositing.

Accordingly, it would be desirable to composite digital images using a programmable graphics processor to perform the high-precision floating-point calculations.

SUMMARY

Various embodiments of the invention include systems and methods for compositing one or more digital images using a programmable graphics processor. The programmable graphics processor receives digital image data from the graphics memory. The programmable graphics processor receives shader program instructions. The programmable graphics processor processes the digital image data using the shader program instructions to generate composited image data.

Alternatively, the programmable graphics processor receives the digital image data and additional digital image data from the graphics memory. The programmable graphics processor receives shader program instructions. The programmable graphics processor processes the digital image data and the additional digital image data using the shader program instructions to generate composited image data.

Alternatively, the programmable graphics processor reads a portion of the digital image data from the graphics memory. The programmable graphics processor processes the portion of the digital image data to generate a portion of a composited image. The reading and processing are repeated for each portion within the composited image.

Alternatively, the programmable graphics processor reads a portion of the first digital image data and a portion of the second digital image data from the graphics memory. The programmable graphics processor processes the portion of first digital image data and the portion of second digital image data to generate a portion of a composited image. The reading and processing are repeated for each portion within the composited image.

Alternatively, the programmable graphics processor reads digital image data from the graphics memory and receives digital video image data. The programmable graphics processor processes the digital video image data and the digital image data to generate composited image data.

The programmable graphics processor includes a memory interface configured to read digital image data from the graphics memory and a fragment processing pipeline configured to generate composited image data by performing at least one compositing operation specified by shader program instructions on the digital image data.

Alternatively, the programmable graphics processor includes a digital video interface configured to receive digital video image data, the memory interface configured to read digital image data from a graphics memory and the fragment processing pipeline configured to perform at least one compositing operation on the digital video image data and the digital image data specified by shader program instructions to generate a composited frame.

The high-precision programmable graphics processor includes a memory interface configured to read high-precision digital image data from the graphics memory and a fragment processing pipeline configured to generate high-precision composited image data by performing at least one high-precision compositing operation specified by shader program instructions on the high-precision digital image data.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

FIG. 5A is a flow diagram of an exemplary embodiment of compositing operations.

FIGS. 5B, 5C and 5D. are exemplary images used in compositing operations.

FIG. 5E is an exemplary composited frame generated in accordance with one or more aspects of the present invention.

FIG. 5F is a flow diagram of an exemplary embodiment of a compositing operation.

FIG. 5G is an exemplary composited frame generated in accordance with one or more aspects of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
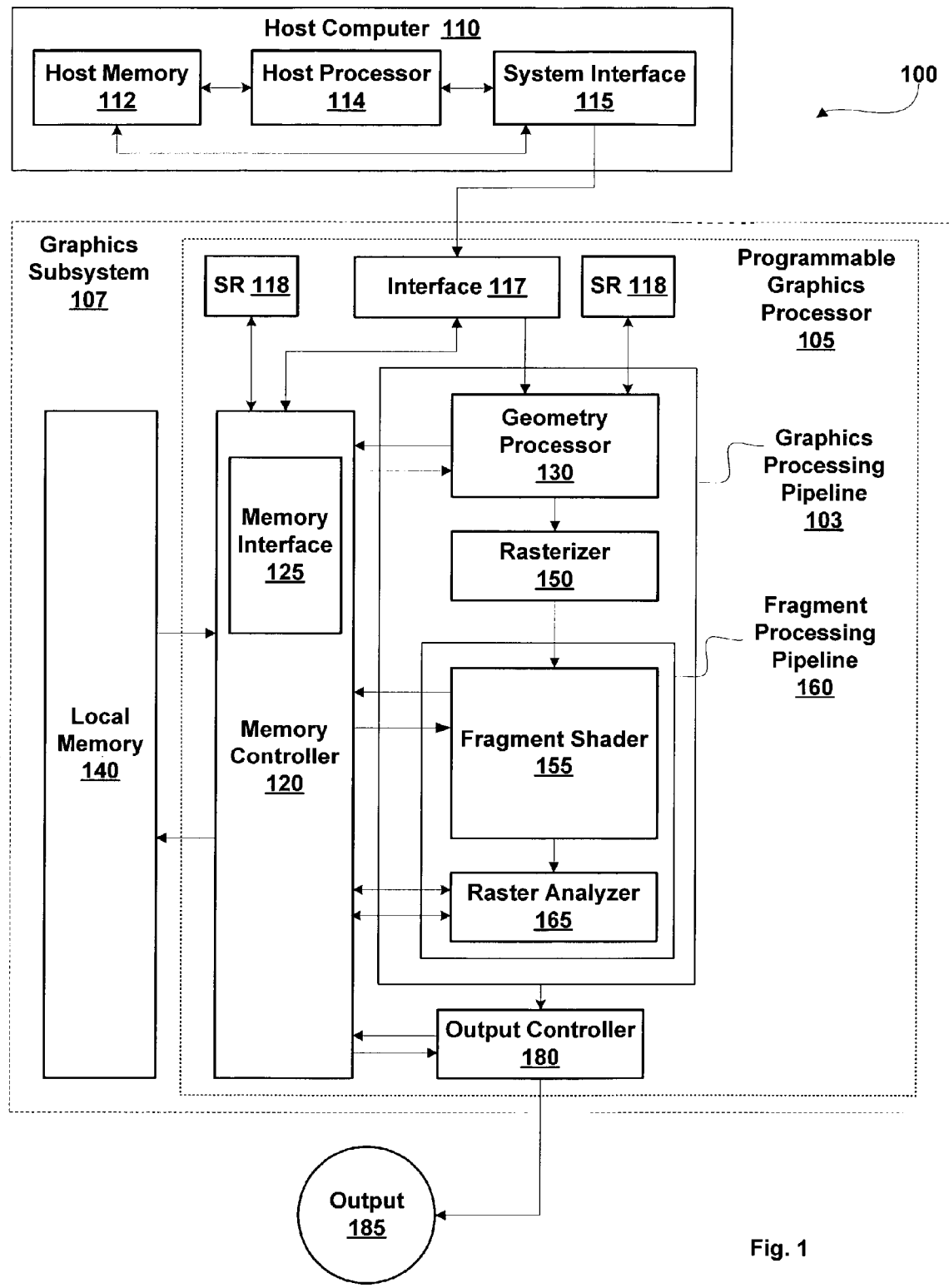
FIG. 1 is a block diagram of an exemplary embodiment of a respective computer system in accordance with one or more aspects of the present invention.

FIG. 1 is a block diagram of an exemplary embodiment of a Computing System generally designated 100 and including a Host Computer 110 and a Graphics Subsystem 107. Computing System 100 may be a desktop computer, server, laptop computer, palm-sized computer, tablet computer, game console, cellular telephone, computer based simulator, or the like. Host computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host computer 110 communicates with Graphics Subsystem 107 via System Interface 115 and an Interface 117. Graphics Subsystem 107 includes a Local Memory 140 and a Programmable Graphics Processor 105. In addition to Interface 117, Programmable Graphics Processor 105 includes a Graphics Processing Pipeline 103, a Memory Controller 120 and an Output Controller 180. Data and program instructions received at Interface 117 can be passed to a Geometry Processor 130 within Graphics Processing Pipeline 103 or written to Local Memory 140 through a Memory Interface 125 within Memory Controller 120. Memory Interface 125 includes read interfaces and write interfaces that each generate address and control signals to Local Memory 140, SR (Storage Resources) 118 and Interface 117. SR 118 can include register files, caches, FIFOs (first in first out), and the like. In addition to communicating with Local Memory 140, SR 118 and Interface 117, Memory Controller 120 also communicates with Graphics Processing Pipeline 103 and Output Controller 180 through read and write interfaces in Graphics Processing Pipeline 103 and a read interface in Output Controller 180. The read and write interfaces in Graphics Processing Pipeline 103 and the read interface in Output Controller 180 generate address and control signals to Memory Controller 120.

Within Graphics Processing Pipeline 105, Geometry Processor 130 and a programmable graphics fragment processing pipeline, Fragment Processing Pipeline 160, perform a variety of computational functions. Some of these functions are table lookup, scalar and vector addition, multiplication, division, coordinate-system mapping, calculation- of vector normals, tessellation, calculation of derivatives, interpolation, and the like. Program instructions specify the functions and the precision of computations to perform the functions. Geometry Processor 130 and Fragment Processing Pipeline 160 are optionally configured such that data processing operations are performed in multiple passes through Graphics Processing Pipeline 103 or in multiple passes through Fragment Processing Pipeline 160. Each pass through Programmable Graphics Processor 105, Graphics Processing Pipeline 103 or Fragment Processing Pipeline 160 concludes with optional processing by a Raster Analyzer 165.

Geometry Processor 130 receives a stream of program instructions, state bundles and data from Interface 117, Memory Controller 120 or SR 118, and performs vector floating-point operations or other processing operations using the data. State bundles are microcoded instructions used to configure subunits within Geometry Processor 130, Rasterizer 150 and Fragment Processing Pipeline 160. Codewords are also microcoded instructions containing information used to configure subunits within Geometry Processor 130, Rasterizer 150 and Fragment Processing Pipeline 160. Geometry Processor 130 generates codewords from vertex program instructions. Codewords generated in Geometry Processor 130 are used by subunits within Geometry Processor 130 and Rasterizer 150. State bundles are used by subunits within Geometry Processor 130, Rasterizer 150 and Fragment Processing Pipeline 160. Alternatively, configuration information is written to registers within Geometry Processor 130, Rasterizer 150 and Fragment Processing Pipeline 160 using program instructions, encoded with the data, or the like.

The program instructions, state bundles and data are stored in graphics memory, e.g., portions of Host Memory 112, Local Memory 140 or SR 118 within Programmable Graphics Processor 105. When a portion of Host Memory 112 is used to store program instructions, state bundles and data the portion of Host Memory 112 can be uncached so as to increase performance of access by Programmable Graphics Processor 105.

Data processed by Geometry Processor 130, together with state bundles, shader program instructions, and codewords are passed from Geometry Processor 130 to a Rasterizer 150. Shader programs are sequences of shader program instructions compiled by Host Processor 114 for execution within Fragment Processing Pipeline 160. In a typical embodiment Rasterizer 150 performs scan conversion on the data processed by Geometry Processor 130 and outputs fragment data, pixel data, or sample data, state bundles and shader program instructions to Fragment Processing Pipeline 160. Each fragment is at least a portion of a pixel. Therefore the shader programs program Fragment Processing Pipeline 160 to operate on fragment, pixel or sample digital image data. For simplicity, the remainder of this description will use the term fragment data to refer to pixel data, sample data, and fragment data. Digital image data is made up of fragment data.

The shader programs program, as discussed below, the Fragment Processing Pipeline 160 to process fragment data by specifying computations and computation precision. A Fragment Shader 155, within Fragment Processing Pipeline 160, generates codewords from shader program instructions. Fragment Shader 155 optionally is configured by codewords generated in Fragment Shader 155 from shader program instructions such that fragment data processing operations are performed in multiple passes within Fragment Shader 155. Fragment data processed by Fragment Shader 155 is passed to Raster Analyzer 165, which optionally performs near and far plane clipping and raster operations, such as stencil, z test, and the like, and saves the results, i.e., composited image data, in graphics memory.

Raster Analyzer 165 includes a read interface and a write interface to Memory Controller 120 through which Raster Analyzer 165 accesses data stored in Local Memory 140 or Host Memory 112. Traditionally, the precision of fragment data written to memory is limited to the color display resolution (24 or 32 bits) and depth (16, 24, or 32 bits). Because Graphics Processing Pipeline 103 is designed to process and output data represented in high-precision data formats, the precision of data generated by Graphics Processing Pipeline 103 need not be limited prior to storage in graphics memory. For example, in various embodiments the data output from Raster Analyzer 165 is represented in a high-precision data format specified by shader program instructions such as 16, 32, 64, 128-bit or higher precision, fixed or floating-point. Therefore, in various embodiments Programmable Graphics Processor 105 is a high-precision programmable graphics processor.

Compositing operations, as hereinafter described, can use high-precision data formats to generate composited images including composited image data and composited frames including composited frame data. Compositing operations include add, subtract, over, under, in, out, multiply, premultiply, atop, color conversion, matte extraction, channel swapping, color differencing, luma-keying, chroma-keying, color correction, panning, rotating, blurring, convolution, filtering, restoration, sharpening, scaling, morphing, special transformations, warping, geometric calibration, image rectification, image registration, image reprojection, and the like. A composited frame is a composited image intended for output, e.g., read from graphics memory or output by Output Controller 180, such as one composited frame in a film sequence of composited frames. Several intermediate composited images can be generated before the final compositing operation to generate the composited frame is performed. Furthermore, each composited image that is output as a composited frame can be further composited to generate additional composited frames. Each composited frame may be represented in a video format for display or further processing as a video frame.

In various embodiments Memory Controller 120, Local Memory 140, and Geometry Processor 130 are configured such that data generated at various points along Graphics Processing Pipeline 103 can be output via Raster Analyzer 165 and provided to Geometry Processor 130 or Fragment Shader 155 as input. Since the output of Raster Analyzer 165 can include floating-point data formats, data is optionally provided to Geometry Processor 130 or Fragment Shader 155 without loss of precision. Furthermore, data is optionally processed in multiple passes through Graphics Processing Pipeline 103 without a loss of precision.

When processing is completed, an Output 185 of Graphics Subsystem 107 is provided using Output Controller 180. Alternatively, Host Processor 114 reads the composited frame stored in Local Memory 140 through Memory Controller 120, Interface 117 and System Interface 115. Output Controller 180 is optionally configured by opcodes from Graphics Processing Pipeline 103 to deliver data to a display device, network, electronic control system, other Computing System 100, other Graphics Subsystem 110, or the like. Alternatively, the data, such as video frames, are output to a film recording device or written to a peripheral device, e.g., disk drive, tape, compact disk, or the like.

Figure 2:
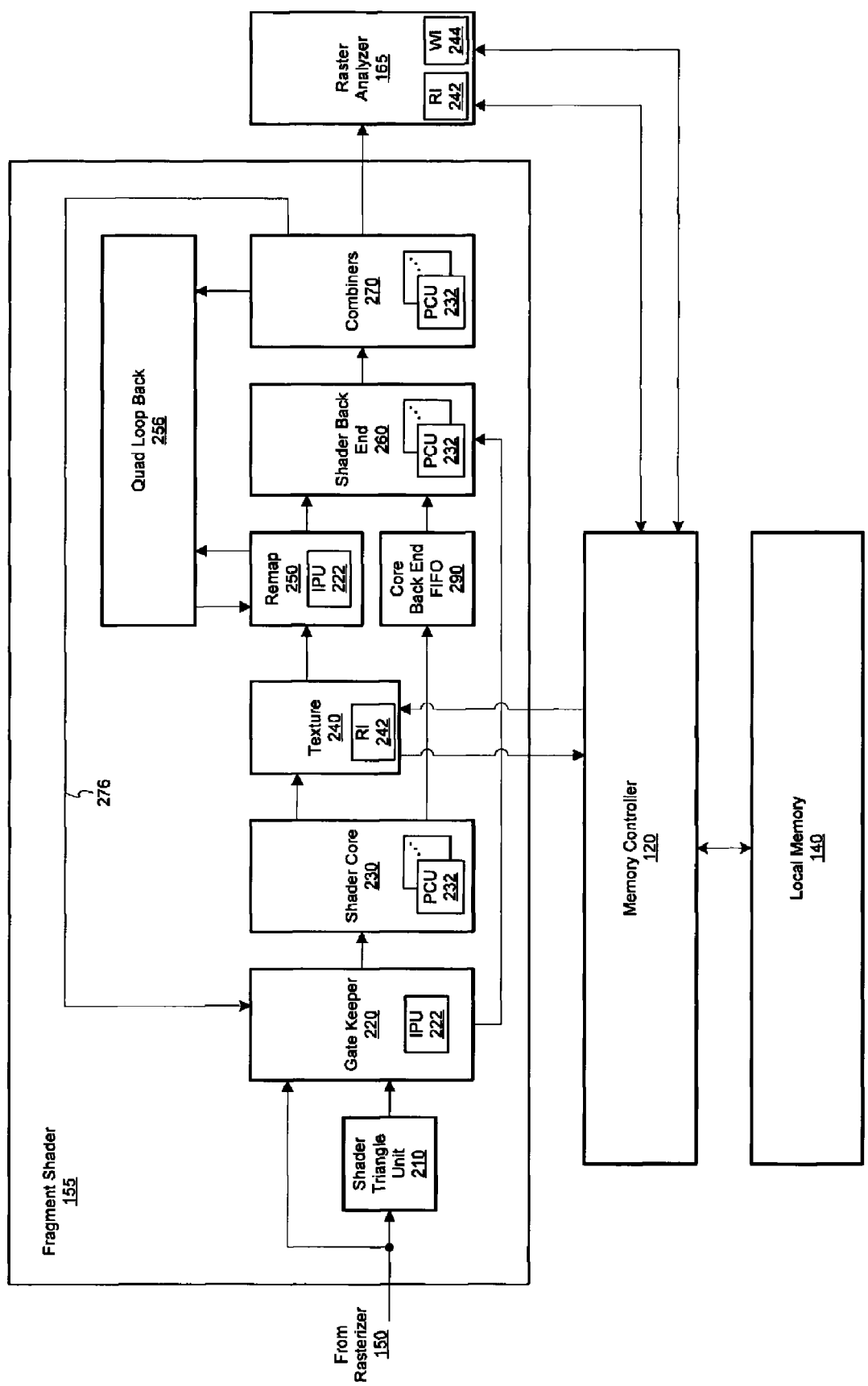
FIG. 2 is a block diagram of an exemplary embodiment of a fragment shader in accordance with one or more aspects of the present invention.

FIG. 2 is a block diagram of Fragment Processing Pipeline 160 including Fragment Shader 155 and Raster Analyzer 165. A Shader Triangle Unit 210 receives fragment data from Rasterizer 150 and calculates plane equations for texture coordinates, depth, and other parameters. A Gate Keeper 220 selects from among the fragment data from Rasterizer 150, the output from Shader Triangle Unit 210 or a Feedback Output 276 from Combiners 270 depending upon the shader program instructions. Gatekeeper 220 selects Feedback Output 276 when fragment data is processed in multiple passes through Fragment Shader 155. Gate Keeper 220 receives the state bundles and shader program instructions from Rasterizer 150. An IPU (Instruction Processing Unit) 222 within Gate Keeper 220 generates codewords from the shader program instructions and inserts the state bundles or codewords in a fragment data stream output to a Shader Core 230. Shader Core 230 performs floating point computations such as triangle parameter interpolation and reciprocals using PCUs (Programmable Computation Unit) 232 on the fragment data stream received from Gate Keeper 220. The position of each codeword in the fragment data stream specifies the PCU 232 that each codeword configures. Alternatively, each codeword includes an address specifying the PCU that each codeword configures. Fragment data processed by Shader Core 230 is optionally input to a Core Back End FIFO 290. State bundles and codewords are output by Shader Core 230 to a Texture 240.

When specified by the codewords received from Shader Core 230 to do so, Texture 240 reads map data (height field, bump, texture, and the like) and shader program instructions from Local Memory 140 or Host Memory 112, via Memory Controller 120, using a RI (Read Interface) 242 within Texture 240. The map data stored in graphics memory can be generated by Programmable Graphics Processor 105, by Host Processor 114, by another device, by a human, or the like. The map data or shader program instructions are received by Texture 240 from Memory Controller 120. Texture 240 processes the map data using filtering functions such as trilinear interpolation, bilinear interpolation, anisotropic filtering, and the like. The processed map data is output to a Remap 250 along with the shader program instructions. The shader program instructions specify the computations, precision of the computations and the precision of the output(s) of the computations performed by PCUs 232. An IPU 222 within Remap 250 interprets the shader program instructions and generates codewords which control the processing completed by PCUs 232 in Fragment Processing Pipeline 160. When multi-pass operations are being performed within Fragment Shader 155, Remap 250 also reads the data fed back from Combiners 270 via a Quad Loop Back 256, synchronizing the fed back data with the processed map data and shader program instructions received from Texture 240. Remap 250 formats the processed map data and fed back data, outputting codewords and formatted data to Shader Back End 260. Shader Back End 260 receives fragment data from Shader Core 230 via Core Back End FIFO 290 and triangle data from Gate Keeper 220 (the triangle data was received by Gate Keeper 220 from Shader Triangle Unit 210). Shader Back End 260 synchronizes the fragment and triangle data with the formatted data from Remap 250. Shader Back End 260 performs computations in PCUs 232 using the input data (formatted data, fragment data, and triangle data) based on codewords received from Remap 250. Shader Back End 260 outputs codewords and shaded fragment data.

The output of Shader Back End 260 is input to Combiners 270 where the codewords are executed by PCUs 232 within Combiners 270 that, in turn, output combined fragment data. The codewords executing in the current pass control whether the combined fragment data will be fed back within Fragment Shader 155 to be processed in a subsequent pass. Combiners 270 optionally output codewords, to be executed by Shader Core 230 and Texture 240 in a subsequent pass, to Gate Keeper 220 using Feedback Path 276. Combiners 270 also optionally output combined fragment data to Quad Loop Back 256 to be used by Remap 250 in a subsequent pass. Finally, Combiners 270 optionally output combined fragment data, e.g., x, y, color, depth, configuration control, other parameters, to Raster Analyzer 165.

Raster Analyzer 165 includes a RI 242 and a WR (write interface) 244 to Memory Controller 120. Raster Analyzer 165 performs raster operations, such as stencil test, z test, blending, and the like, using the combined fragment data and pixel data stored in graphics memory at the x,y location associated with the combined fragment data. The output data from Raster Analyzer 165 is written back to graphics memory at the x,y locations associated with the output data. The output data is represented in one or more formats as specified by the codewords. For example, color data may be written as 16, 32, 64, or 128 bit per pixel fixed or floating-point RGBA (red, green, blue, and alpha) to be scanned out for display. Specifically, four 16 bit floating point components (RGBA) are combined forming 64 bits of color data for each fragment. Likewise four 32 bit floating point components are combined forming 128 bits of color data for each fragment. Combinations of various numbers of bits of floating or fixed point components can be combined to form 16, 32, 64 or 128 or more bit color data formats. Color data may be stored in graphics memory to be used as a texture map by a shader program executed in a subsequent pass through Fragment Processing Pipeline 160 or through Graphics Processing Pipeline 103. Alternatively, color and depth data may be written, and later read and processed by Raster Analyzer 165 to generate the final pixel data prior to being scanned out for display via Output Controller 180.

Fragment Shader 155 can be programmed to perform compositing operations on multiple images stored in graphics memory. In some embodiments of Programmable Graphics Processor 105, the compositing operations on multiple images are performed in real-time. The images can be generated by Graphics Processing Pipeline 103 or generated by Host Computer 114. The multiple images are composited, i.e., processed using compositing operations, in Graphics Processing Pipeline 103 to generate one composited frame. Point compositing operations are compositing operations which read a fragment from a single (x,y) location in at least one source image and write a fragment to a (x,y) location in a composited destination image. Point compositing operations include add, subtract, over, under, in, out, multiply, premultiply, atop, color conversion, matte extraction, channel swapping, color differencing, luma-keying, chroma-keying, color correction, panning, rotating, and the like. Point compositing operations can be completed in a single pass through Fragment Processing Pipeline 160. Depending on the number of images to be composited or the number of compositing operations to be performed, multiple passes within Fragment Shader 155 may be needed to execute the shader program. The composited frame is output by Raster Analyzer 165 and stored in graphics memory.

Region compositing operations such as blurring, convolution, filtering, restoration, sharpening, scaling, warping, and the like can be performed on a source image to generate a composited destination image. Other region compositing operations, such as morphing, and the like, require two or more source images to generate a composited destination image. Region compositing operations require neighboring fragment data from the at least one source image to generate each fragment in the composited destination image. The neighboring fragment data within the region may be adjacent fragment data, e.g., from (x,y), (x+1,y), and (x, y+1) locations in the at least one source image, or nearby fragment data, e.g., from (x,y), (x+3,y), and (x, y+3) locations in the at least one source image. Therefore, at least two (x,y) locations in at least one of the at least one source image are read to generate and write a composited fragment to an (x,y) location in the composited destination image. In one embodiment, when at least one compositing operation precedes a region operation, the composited image generated by the at least one compositing operation is output by Fragment Processing Pipeline 160 and stored in graphics memory. The fragment data and neighboring fragment data is read by Fragment Shader 155 and the region compositing operation is performed. In an alternate embodiment, the neighboring data is accessible within Fragment Shader 155 and the region compositing operation is performed without storing the composited image generated by the at least one compositing operation.

Figure 3A:
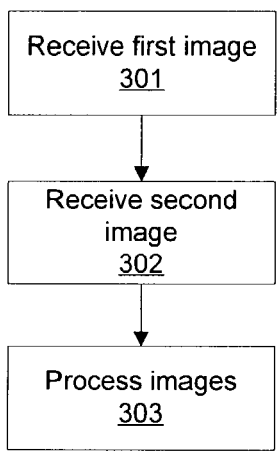
FIGS. 3A, 3B, 3C, 3D and 3E are a flow diagrams of exemplary embodiments of compositing processes in accordance with one or more aspects of the present invention.

FIG. 3A is a flow diagram of a compositing process resulting in the generation of a composited image. In step 301 Texture 240 receives a first image from Memory Controller 120. In step 302 Texture 240 receives a second image from Memory Controller 120 to be composited with the first image. In step 303 at least one PCU 232 in Fragment Shader 155 processes the first image data and the second image data to generate composited image data.

Figure 3B:
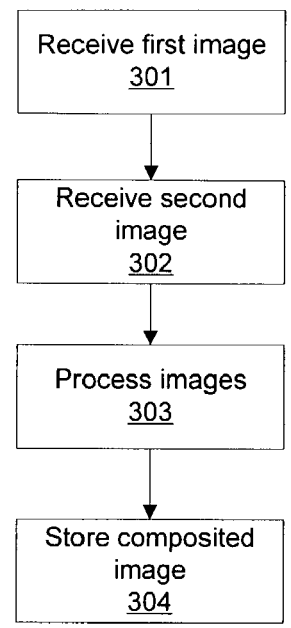

FIG. 3B is a flow diagram of a compositing process including the steps in FIG. 3A. In step 301 Texture 240 receives the first image from Memory Controller 120. In step 302 Texture 240 receives the second image from Memory Controller 120 to be composited with the first image. In step 303 the at least one PCU 232 in Fragment Shader 155 processes the first image data and the second image data to generate the composited image data. The composited image data is generated in a single pass through Fragment Shader 155. In step 304 Raster Analyzer 165 stores the composited image data in graphics memory by writing the composited image data to graphics memory. Alternatively, the composited image data is output to a film recording device or written to a peripheral device, e.g., disk drive, tape, compact disk, or the like.

Figure 3C:
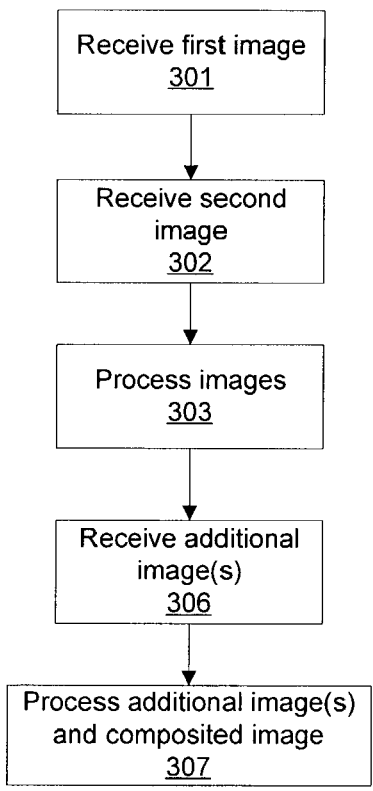

FIG. 3C is a flow diagram of a compositing process including the steps in FIG. 3A. In step 301 Texture 240 receives the first image from Memory Controller 120. In step 302 Texture 240 receives the second image from Memory Controller 120 to be composited with the first image. In step 303 the at least one PCU 232 in Fragment Shader 155 processes the first image data and the second image data to generate the composited image data. In step 306 Texture 240 receives an additional image from Memory Controller 120 to be composited with the composited image. In step 307 the at least one PCU 232 in Fragment Shader 155 processes the additional image data and the composited image data to generate further composited image data. In one embodiment the composited image data and the further composited image data are generated in a single pass through Fragment Shader 155. In another embodiment the composited image data is generated in a first pass within Fragment Shader 155 and the further composited image data is generated in a second pass within Fragment Shader 155.

Figure 3D:
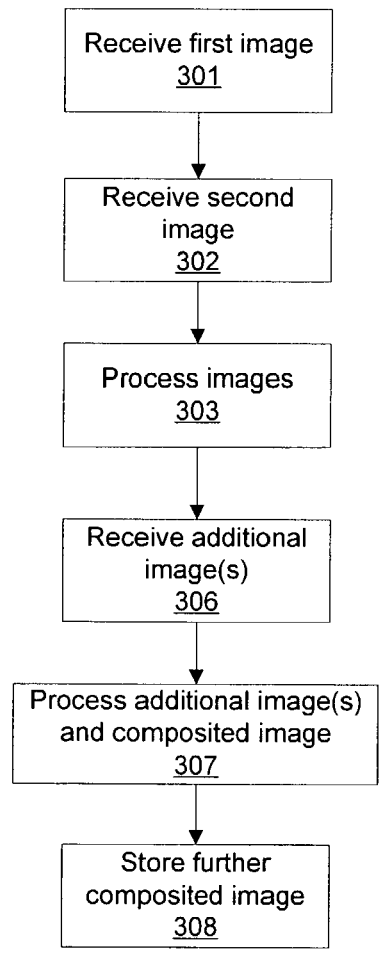

FIG. 3D is a flow diagram of a compositing process including the steps in FIG. 3C. In step 301 Texture 240 receives the first image from Memory Controller 120. In step 302 Texture 240 receives the second image from Memory Controller 120 to be composited with the first image. In step 303 the at least one PCU 232 in Fragment Shader 155 processes the first image data and the second image data to generate the composited image. In step 306 Texture 240 receives an additional image from Memory Controller 120 to be composited with the composited image. In step 307 the at least one PCU 232 in Fragment Shader 155 processes the additional image data and the composited image data to generate a further composited image. In step 308 Raster Analyzer 165 stores the further composited image data in graphics memory by writing the further composited image data to graphics memory. Alternatively, the further composited image data is output to a film recording device or written to a peripheral device, e.g., disk drive, tape, compact disk, or the like.

Figure 3E:
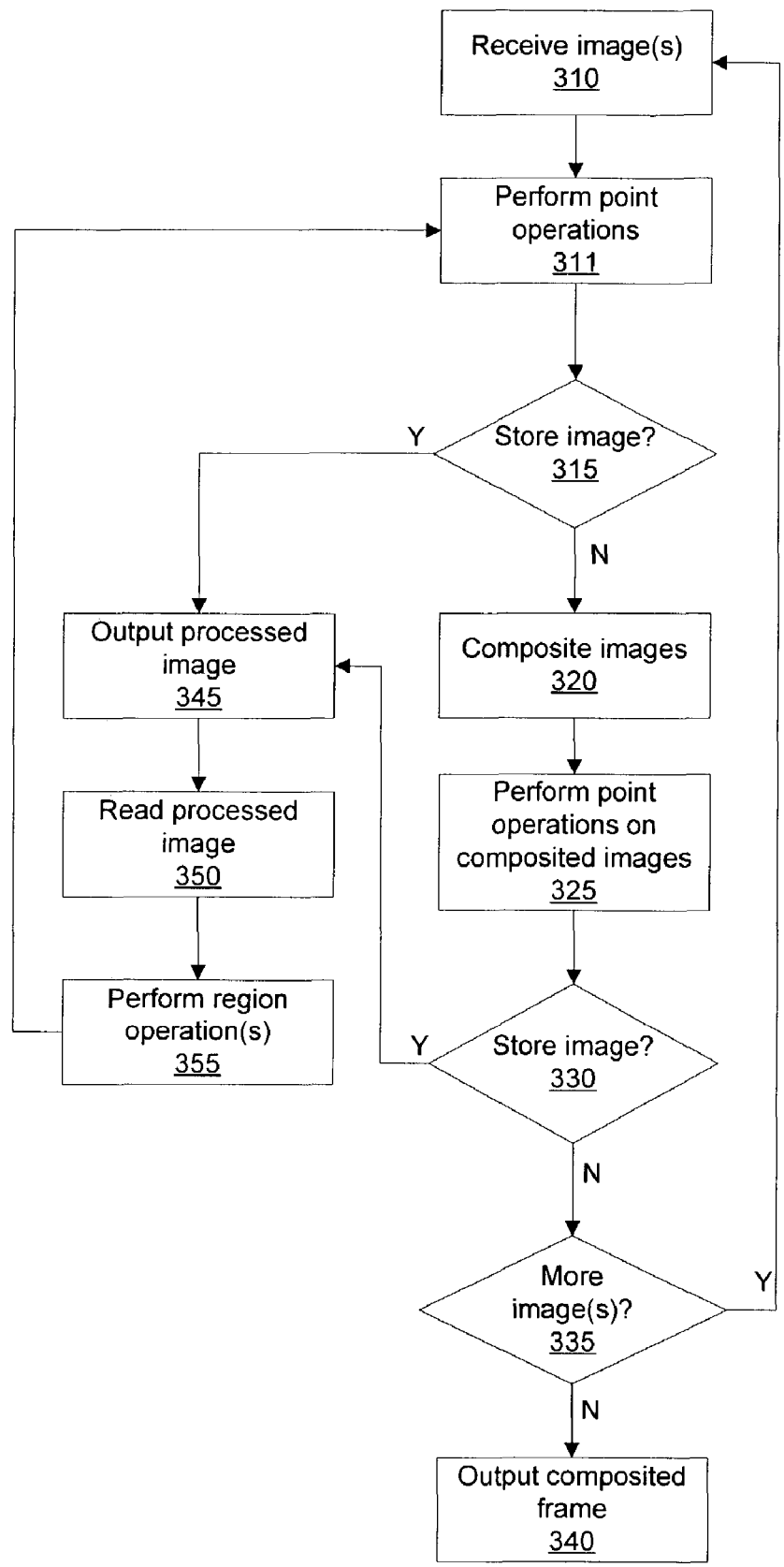

FIG. 3E is a flow diagram of compositing processes resulting in the generation of a composited frame. In step 310 Texture 240 receives at least one image to be composited from Memory Controller 120. In step 311 Shader Back End 260 is configured by codewords to process the at least one image by performing point compositing operations (add, subtract, over, under, in, out, multiply, premultiply, atop, color conversion, matte extraction, channel swapping, color differencing, luma-keying, chroma-keying, color correction, panning, rotating, and the like) on the at least one image and outputting a point operation composited image to Combiners 270. In step 315 Combiners 270 determine if the codewords specify to store the point operation composited image in graphics memory for further processing, and, if so, in step 345 Combiners 270 outputs the point operation composited image to Raster Analyzer 165. Raster Analyzer 165 stores the point operation composited image in graphics memory via Memory Controller 120. In step 350 Texture 240 initiates a read request to read the point operation composited image and Texture 240 receives the point operation composited image from Memory Controller 120. In step 355 the point operation composited image is output by Texture 240 to Shader Back End 260 via Remap 250 and Shader Back End 260 is configured by codewords to process the point operation composited image by performing region operations on the point operation composited image to generate a region operation composited image.

In step 311 Shader Back End 260 is configured by codewords to process the region operation composited image by performing point operations on the region operation composited image and outputting a multi-operation composited image to Combiners 270. In step 315 Combiners 270 determine if the codewords specify to store the multi-operation composited image in graphics memory for further processing, and, if not, in step 320 Shader Back End 260 is configured by codewords to process the multi-operation composited image by compositing the multi-operation composited image with at least one other image to generate a multi-image composited image. The other image can be read from graphics memory and is composited using at least one point or region compositing operation. For example, the multi-operation composited image, image B, is a background and the other image, image A, is an element composited with the background using an A over B compositing operation. Each fragment in the other image is combined with each corresponding fragment in the multi-operation composited image using the A over B operation. When image A or image B is not premultiplied by alpha, a PCU 232 within Shader Back End 260 is configured by codewords to produce a premultiplied image A or image B. Images may be "premultiplied" such that each color component for a fragment has been multiplied by alpha for the fragment. Premultiplied fragments of image A and image B are input to the PCU 232 or another PCU 232 that performs the A over B operation to produce each fragment of the multi-image composited image.

Continuing in step 325, Shader Back End 260 is configured by codewords to perform point operations on the multi-image composited image and output a point operation multi-image composited image to Combiners 270. In step 330 Combiners 270 determine if the codewords specify to store the point operation multi-image composited image in graphics memory for further processing, and, if so, steps 345, 350, 355, 310, 315, 320 and 325 are repeated to generate a further composited image.

If in step 330 Combiners 270 determine the codewords do not specify to store the composited image in graphics memory for further processing, in step 335 Combiners 270 determine if the codewords specify at least one more image to be composited. If in step 335 Combiners 270 determine the codewords specify at least one more image to be composited, in step 310 Texture 240 receives the at least one additional image to be composited from Memory Controller 120. In step 311 Shader Back End 260 is configured by codewords to perform point operations on the at least one additional image and output an additional point operation composited image to Combiners 270. In step 315 Combiners 270 determine if codewords specify to store the additional point operation composited image in graphics memory for further processing, and, if not, in step 320 Shader Back End 260 is configured by codewords to composite the additional point operation composited image with the further composited image and generate a yet further composited image. In step 325 Shader Back End 260 is configured by codewords to perform point operations on the yet further composited image and output a composited frame to Combiners 270. In step 330 Combiners 270 determine if the codewords specify to store the composited frame in graphics memory for further processing, and, if not, in step 335 Combiners 270 determine if the codewords specify at least one more image to be composited. If in step 335 Combiners 270 determine the codewords do not specify at least one more image to be composited, in step 340 the composited frame is output to Raster Analyzer. 165. Alternatively, the composited frame is output to a film recording device or written to a peripheral device, e.g., disk drive, tape, compact disk, or the like.

Figure 4A:
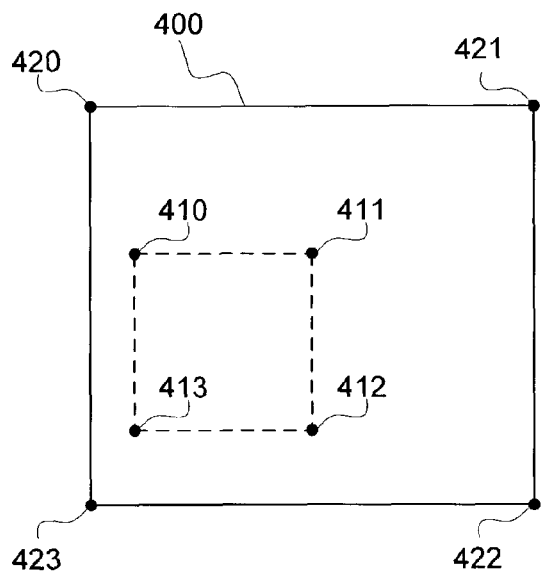
FIGS. 4A, 4B and 4C are diagrams of image portion selection in accordance with one or more aspects of the present invention.
Figure 4B:
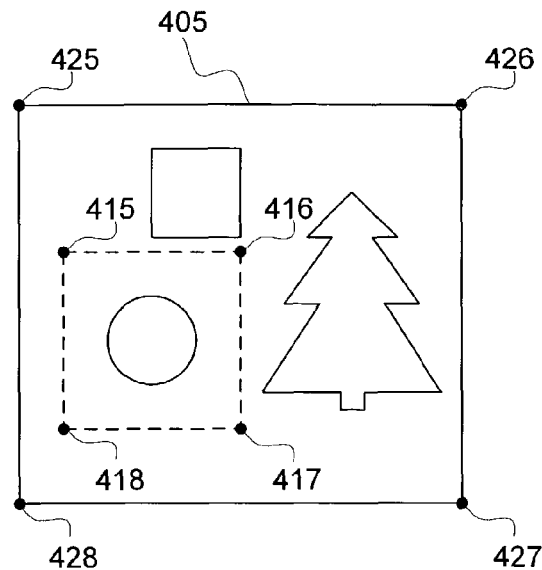
Figure 4C:
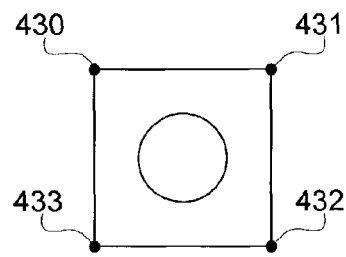

Graphics Processing Pipeline 103 can be used to composite images using vertices to specify a region of each image. FIGS. 4A, 4B and 4C are diagrams of image portion selection in accordance with one or more aspects of the present invention. In FIG. 4A Position Coordinates 420, 421, 422 and 423 are each an (x,y) point defining a two-dimensional Geometry 400. The area bounded by Position Coordinates 410, 411, 412 and 413 defines a portion of Geometry 400 to be rendered. In FIG. 4B Texture Parameters 425, 426, 427 and 428 are each an (s,t) texel within a two-dimensional Image 405. The texels bounded by Texture Parameters 415, 416, 417 and 418 define a portion of Image 405 to be rendered.

In FIG. 4C Vertex 430 includes Position Coordinate 410 and Texture Parameter 415. Likewise Vertices 431, 432 and 433 include Position Coordinates 411, 412 and 413 respectively and Texture Parameters 416, 417 and 417 respectively. Alternatively, Vertices 431, 432 and 433 can include additional parameters such as color, other textures, user defined values, and the like. The portion of Image 405 bounded by Texture Parameters 415, 416, 417 and 418 included in Vertices 430, 431, 432 and 433 is mapped to the portion of Geometry 400 defined by Position Coordinates 410, 411, 412 and 413. Compositing operations can be performed, as described in FIG. 3, using the portion of Image 405 mapped to the portion of Geometry 400. Additional vertices can be used to select other portions of Image 405 or portions of additional images that can be composited.

FIG. 5A is a flow diagram of compositing operations including matte extraction. FIGS. 5B, 5C and 5D are exemplary images used by the compositing operations. FIG. 5E is an exemplary composited frame generated by the compositing operations. In step 505 Texture 240 receives Image 550 from Memory Controller 120. In step 510 Shader Back End 260 is configured by codewords to key a Matte 560 using a technique known in the art and output Matte 560 to Combiners 270. In step 515 Combiners 270 output Matte 560 to Raster Analyzer 165 that stores Matte 560 in graphics memory via WI 244 and Memory Controller 120. Storing Matte 560 in graphics memory completes a first pass through Fragment Processing Pipeline 160. In one embodiment Matte 560 is stored as an alpha component of Image 550. Alternatively, Matte 560 is stored independently of Image 550. The alpha component is typically used to store coverage or opacity data for each fragment.

In step 520 Texture 240 initiates a read request to read Matte 560. Matte 560 is mapped to a geometry that is rotated and scaled relative to orientation of Frame 580. When texels in Matte 560 are read by Texture 240, the texels are mapped to the geometry, i.e., a texture stored as Matte 560 is applied to the geometry, and a warped Matte 560 is produced. Texture 240 outputs warped Matte 560 to Shader Back End 260 that is configured by codewords to shade warped Matte 560 using a technique known in the art and generates a shaded warped Matte 560 that appears as a shadow in Frame 580. In step 525 Texture 240 initiates a read request to read Matte 560 and Texture 240 receives Matte 560. In step 530 Texture 240 initiates a read request to read Image 550 and Texture 240 receives Image 550. In step 535 Texture 240 initiates a read request to read Image 570 and Texture 240 receives Image 570. In step 540 Shader Back End 260 is configured by codewords to apply Matte 560 to Image 550 using Matte 560 to extract a portion of Image 550. For example, when Matte 560 is used as an alpha map and each fragment of Image 550 is multiplied by each alpha such that each transparent alpha combines with each fragment to produce a transparent fragment. In step 545 Shader Back End 260 is further configured by codewords to composite Image 570, shaded warped Matte 560 and the portion of Image 550 using a compositing operation such as over to generate a composited frame, Frame 580, and output Frame 580 to Combiners 270. In step 590 Combiners 270 output Frame 580 to Raster Analyzer 165 that stores Frame 580 in graphics memory via WI 244 and Memory Controller 120. Storing Frame 580 in graphics memory completes a second pass through Fragment Processing Pipeline 160.

FIG. 5F is a flow diagram of a point compositing operation, chroma-keying. FIG. 5B is an exemplary image used as an input including a Tree 503. FIG. 5G is an exemplary composited frame generated by the point compositing operation. In step 505 Texture 240 receives Image 550 from Memory Controller 120. In step 507 Shader Back End 260 is configured by codewords to extract fragments representing Tree 503 using a technique known in the art and output a composited frame, Frame 595, to Combiners 270. In step 509 Combiners 270 output Frame 595 to Raster Analyzer 165 that stores Frame 595 in graphics memory via WI 244 and Memory Controller 120.

Figure 6A:
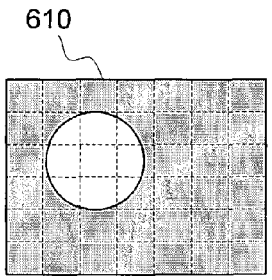
FIGS. 6A, 6B and 6C are exemplary images used in compositing operations.
Figure 6B:
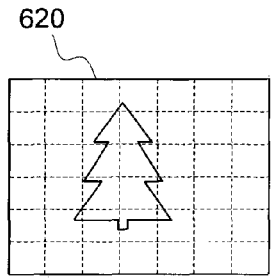
Figure 6C:
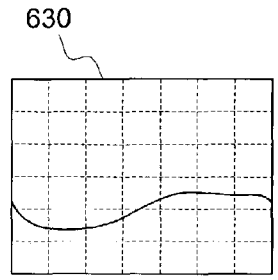
Figure 6D:
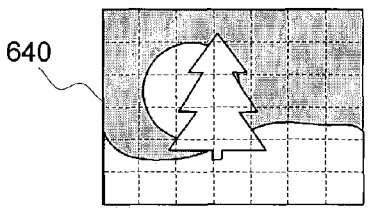
FIG. 6D is an exemplary composited frame generated in accordance with one or more aspects of the present invention.

When the access speed of Local Memory 140 is faster than Host Memory 112, it is desirable to store images to be composited in Local Memory 140 for higher performance during compositing. Alternatively, portions, e.g., tiles, of the images to be composited are loaded into Local Memory 140 prior to compositing rather than loading each entire image prior to compositing. The compositing is performed on corresponding input tiles to generate a composited output tile. FIGS. 6A, 6B and 6C are exemplary images used in compositing operations. FIG. 6D is an exemplary composited frame generated in accordance with one or more aspects of the present invention. Images 610, 620 and 630 are each divided into tiles corresponding to tiles in a composited frame, Frame 640. Each tile contains at least one fragment. Corresponding tiles of Images 610, 620 and 630 are composited to generate each corresponding tile of Frame 640.

Figure 6E:
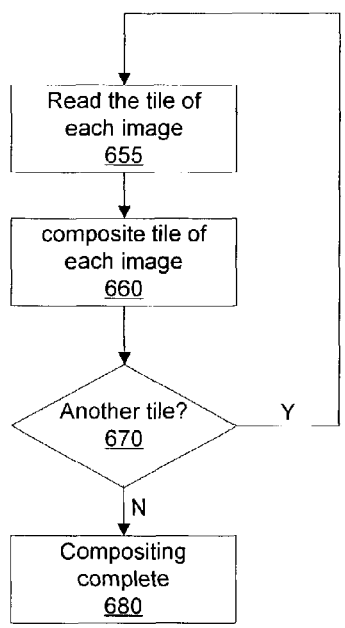
FIGS. 6E and 6F are flow diagrams of exemplary embodiments of compositing to generate an output frame in accordance with one or more aspects of the present invention.

FIG. 6E is a flow diagram of compositing Images 610, 620 and 630 to generate Frame 640. In step 655 Texture 240 issues a read request to read data in corresponding first tiles of Images 610, 620 and 630. In step 660 the data in the corresponding tiles of Images 610, 620 and 630 is received by Shader Back End 260 and at least one PCU 232 is configured by codewords to perform at least one compositing operation to combine the corresponding first tiles of Images 610, 620 and 630 and generate a corresponding tile in a composited image, Frame 640. In step 670 Remap 250 determines if there is another tile to be composited, and, if so, repeats steps 655 and 660 for successive tiles of Images 610, 620 and 630. If in step 670 Remap 250 determines there is not another tile to be composited, in step 680 compositing Images 610, 620 and 630 to generate Frame 640 is complete.

Figure 6F:
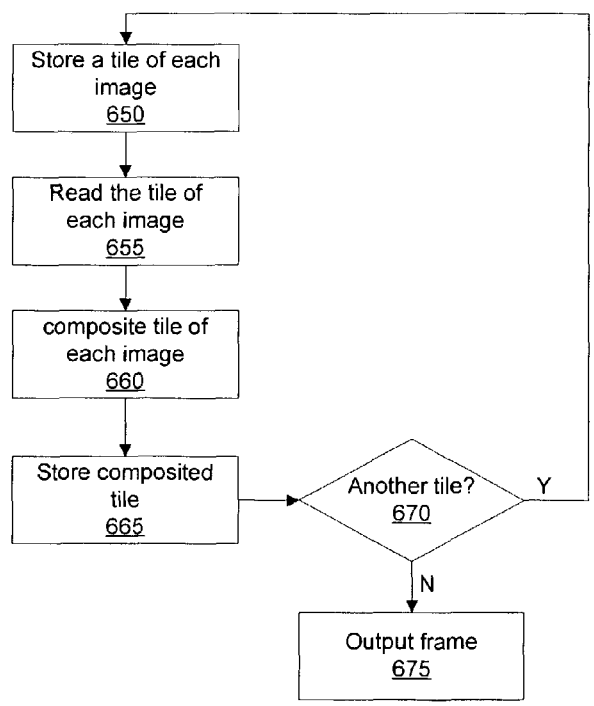

FIG. 6F is a flow diagram of compositing Images 610, 620 and 630 and storing composited tiles to generate Frame 640. In step 650 corresponding first tiles of Images 610, 620 and 630 are stored in Local Memory 140. In step 655 Texture 240 issues a read request to read the data in the corresponding first tiles of Images 610, 620 and 630. In step 660 the data in the corresponding tiles of Images 610, 620 and 630 is received by Shader Back End 260 and at least one PCU 232 is configured by codewords to perform at least one compositing operation to combine the corresponding first tiles of Images 610, 620 and 630 and generate a corresponding tile in a composited image, Frame 640. In step 665 Remap 250 stores the corresponding tile in Frame 640 in graphics memory. In step 670 Remap 250 determines if there is another tile to be composited, and, if so, repeats steps 650, 655, 660 and 665 for successive tiles of Images 610, 620 and 630. If in step 670 Remap 250 determines there is not another tile to be composited, in step 675 Frame 640 is output by Output Controller 180.

Figure 7A:
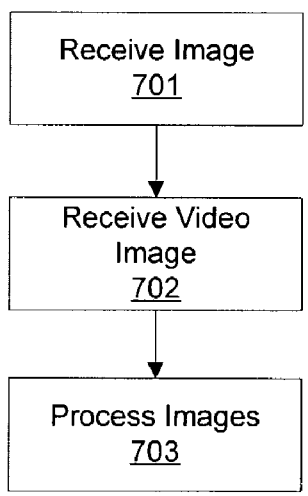
FIGS. 7A, 7B, 7C, 7D and 7E are flow diagrams of exemplary embodiments of compositing using digital video image data in accordance with one or more aspects of the present invention.

In an alternate embodiment Programmable Graphics Processor 105 receives video image data to be composited. FIG. 7A is a flow diagram of a compositing process resulting in the generation of a composited image using a video image. In step 701 Texture 240 receives an image from Memory Controller 120. In step 702 Programmable Graphics Processor 105 receives a video image to be composited with the image. In step 703 the at least one PCU 232 in Fragment Shader 155 processes the image data and the video image data to generate composited image data.

Figure 7B:
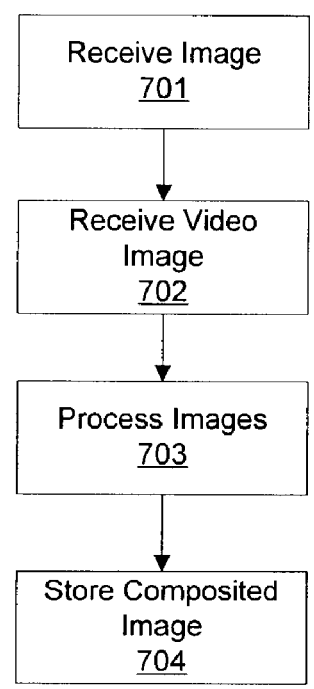

FIG. 7B is a flow diagram of a compositing process including the steps in FIG. 7A. In step 701 Texture 240 receives an image from Memory Controller 120. In step 702 Programmable Graphics Processor 105 receives a video image to be composited with the image. In step 703 the at least one PCU 232 in Fragment Shader 155 processes the image data and the video image data to generate composited image data. In step 704 Raster Analyzer 165 stores the composited image data in graphics memory by writing the composited image data to graphics memory. Alternatively, the composited image data are output to a film recording device or written to a peripheral device, e.g., disk drive, tape, compact disk, or the like.

Figure 7C:
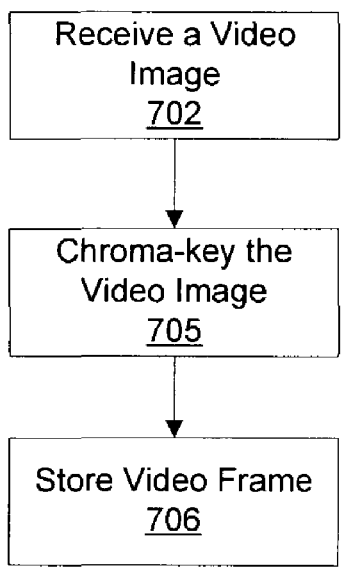

FIG. 7C is a flow diagram of a point compositing operation, chroma-keying using a video image as input. In step 702 Programmable Graphics Processor 105 receives a video image to be composited. In step 705 the at least one PCU 232 in Fragment Shader 155 processes the video image data to generate a composited video frame extracting pixels based on each pixel's color data. In step 706 Raster Analyzer 165 stores the composited video frame in graphics memory by writing the composited video frame to graphics memory. Alternatively, the video frame is output to a film recording device or written to a peripheral device, e.g., disk drive, tape, compact disk, or the like.

Figure 7D:
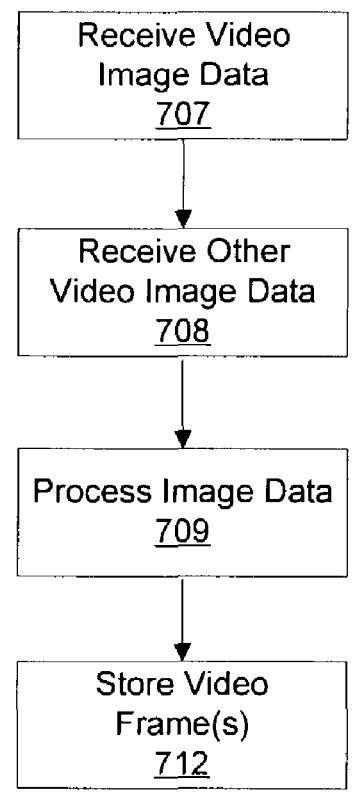

FIG. 7D is a flow diagram of a compositing process for compositing two digital video streams, each stream including video images. In step 702 Programmable Graphics Processor 105 receives video image data that is part of a first digital video stream. In step 708 Programmable Graphics Processor 105 receives other video image data to be composited with the video image data, the other video image data being part of a second digital video stream. In step 709 the at least one PCU 232 in Fragment Shader 155 processes the video image data and the other video image data using at least one point or region compositing operation to generate one or more composited video frames. In step 712 Raster Analyzer 165 stores the one or more composited video frames in graphics memory by writing the one or more composited video frames to graphics memory.

Figure 7E:
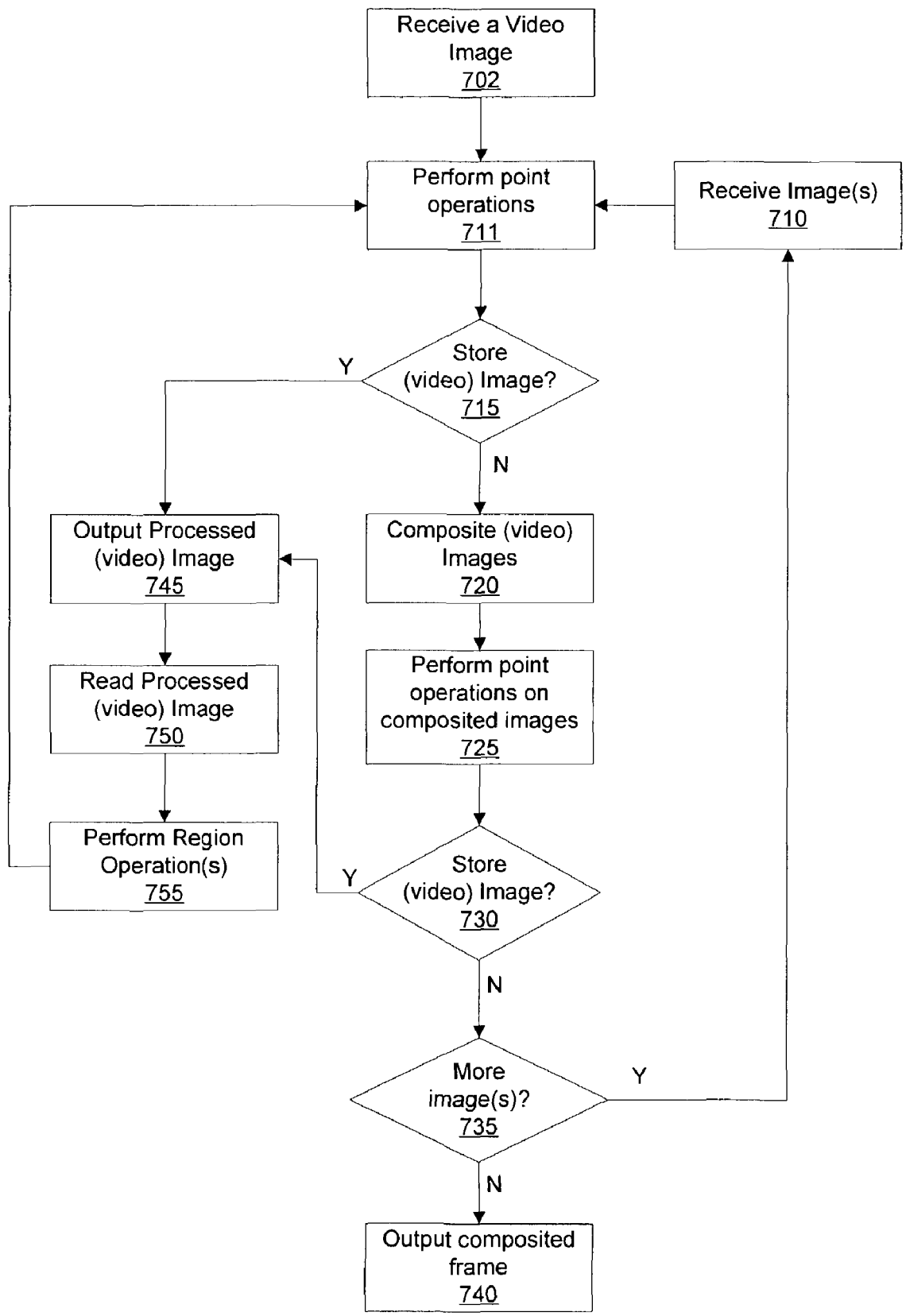

FIG. 7E is a flow diagram of compositing processes resulting in the generation of a composited video frame. In step 702 Programmable Graphics Processor 105 receives video image data receives at least one video image to be composited from a video unit to be described further herein. In step 711 Shader Back End 260 is configured by codewords to process the at least one video image by performing point compositing operations on the at least one video image and outputting a point operation composited video image to Combiners 270. In step 715 Combiners 270 determine if the codewords specify to store the point operation composited video image in graphics memory for further processing, and, if so, in step 745 Combiners 270 outputs the point operation composited video image to Raster Analyzer 165. Raster Analyzer 165 stores the point operation composited video image in graphics memory via Memory Controller 120. In step 750 Texture 240 initiates a read request to read the point operation composited image and Texture 240 receives the point operation composited video image from Memory Controller 120. In step 755 the point operation composited video image is output by Texture 240 to Shader Back End 260 via Remap 250 and Shader Back End 260 is configured by codewords to process the point operation composited video image by performing region operations on the point operation composited video image to generate a region operation composited video image.

In step 711 Shader Back End 260 is configured by codewords to process the region operation composited video image by performing point operations on the region operation composited video image and outputting a multi-operation composited video image to Combiners 270. In step 715 Combiners 270 determine if the codewords specify to store the multi-operation composited image in graphics memory for further processing, and, if not, in step 720 Shader Back End 260 is configured by codewords to process the multi-operation composited video image by compositing the multi-operation composited video image with at least one other image to generate a multi-image composited image.

The other image can be read from graphics memory or received from Memory Controller 120, Interface 117, or the video unit (to be described further herein) and is composited using at least one point or region compositing operation. In step 725, Shader Back End 260 is configured by codewords to perform point operations on the multi-image composited image and output a point operation multi-image composited image to Combiners 270. In step 730 Combiners 270 determine if the codewords specify to store the point operation multi-image composited image in graphics memory for further processing, and, if so, steps 745, 750, 755, 710, 715, 720 and 725 are repeated to generate a further composited image.

If in step 730 Combiners 270 determine the codewords do not specify to store the composited image in graphics memory for further processing, in step 735 Combiners 270 determine if the codewords specify at least one more image to be composited. If in step 735 Combiners 270 determine the codewords specify at least one more image to be composited, in step 710 Texture 240 receives the at least one additional image to be composited from Memory Controller 120. In step 711 Shader Back End 260 is configured by codewords to perform point operations on the at least one additional image and output an additional point operation composited image to Combiners 270. In step 715 Combiners 270 determine if codewords specify to store the additional point operation composited image in graphics memory for further processing, and, if not, in step 720 Shader Back End 260 is configured by codewords to composite the additional point operation composited image with the further composited image and generate a yet further composited image. In step 725 Shader Back End 260 is configured by codewords to perform point operations on the yet further composited image and output a composited frame or a composited video frame to Combiners 270. In step 730 Combiners 270 determine if the codewords specify to store the composited frame or the composited video frame in graphics memory for further processing, and, if not, in step 735 Combiners 270 determine if the codewords specify at least one more image to be composited. If in step 735 Combiners 270 determine the codewords do not specify at least one more image to be composited, in step 740 the composited frame or composited video frame is output to Raster Analyzer 165. Alternatively, the composited frame or composited video frame is output to a film recording device or written to a peripheral device, e.g., disk drive, tape, compact disk, or the like.

Figure 8:
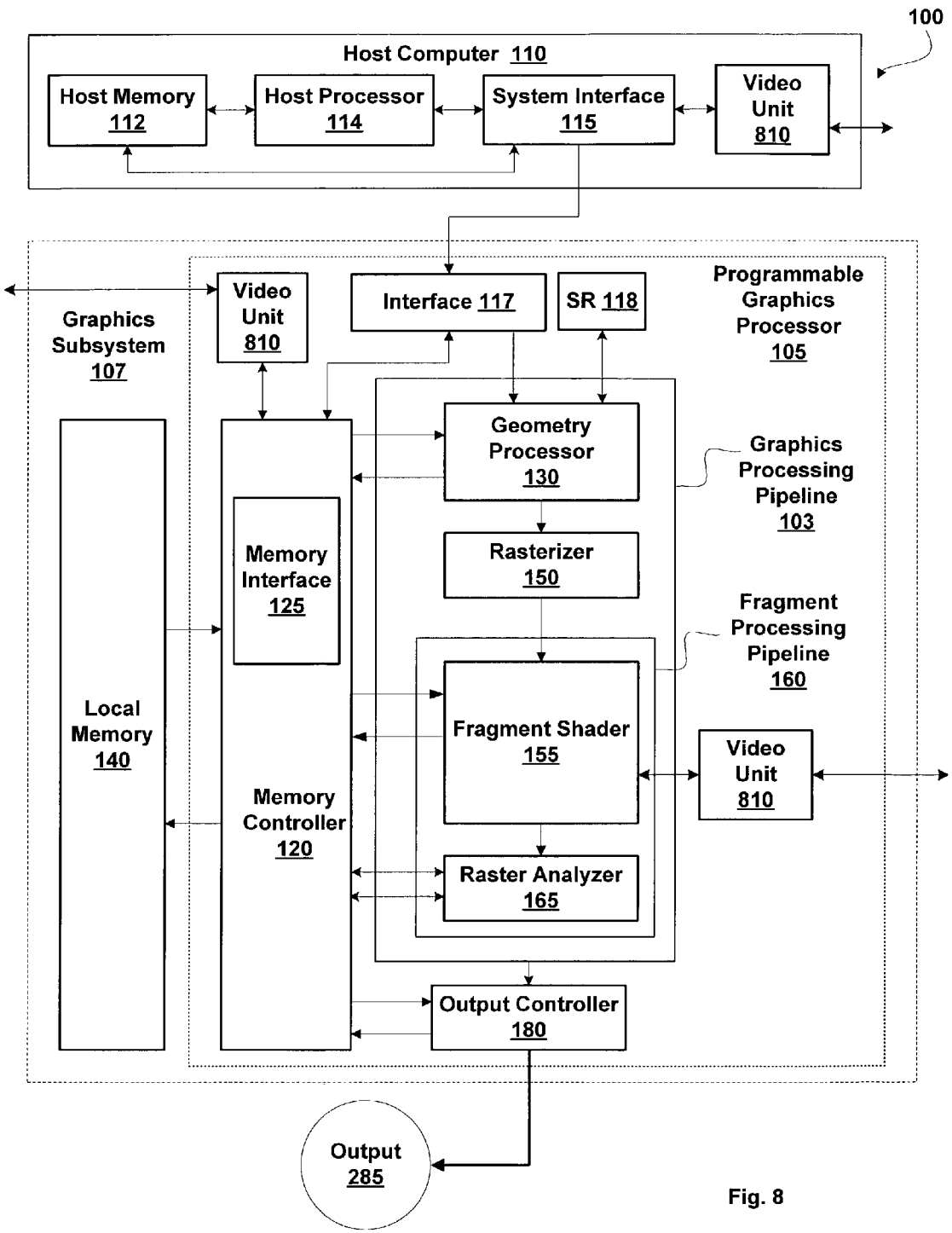
FIG. 8 is a block diagram of an exemplary embodiment of a respective computer system in accordance with one or more aspects of the present invention.

FIG. 8 is a block diagram of an exemplary embodiment of a respective computer system including a Video Unit 810 that receives video image data and outputs digital video image data. In one embodiment, Video Unit 810 includes a storage resource, e.g., register file, FIFO, cache, and the like, and a synchronization unit to output successive frames of video data. Video Unit 810 can interface directly to Memory Controller 120, System Interface 115 or Fragment Shader 155.

While foregoing is directed to embodiments in accordance with one or more aspects of the present invention, other and further embodiments of the present invention may be devised without departing from the scope thereof, which is determined by the claims that follow. Claims listing steps do not imply any order of the steps unless such order is expressly indicated.

All trademarks are the respective property of their owners.

The invention claimed is:

1. A method of compositing digital images in a programmable graphics processor including a fragment processor, the fragment processor being configured by codewords to perform one or more of a plurality of point compositing operations, comprising:

receiving digital image data representing a first source image capable of independent display including first fragment data defined by vertices from a local memory coupled to the programmable graphics processor;

receiving shader program instructions and state bundles at a gatekeeper unit, which also receives feedback data from a combiner unit, to enable processing of the first fragment data in one or more passes through the fragment processor selecting between the digital image data and the feedback data;

processing within the fragment processor the digital image data stored in a local memory or fed back from the combiner unit on a point basis using the shader program instructions which define first codewords to generate composited image data, the state bundles and codewords being inserted in a fragment data stream, the digital image data being read from a single (x,y) location in the first source image and rewritten to a single (x,y) location in a composited destination image represented by the composited image data;

receiving additional digital image data of at least one additional digital image representing a second source image including neighboring fragment data defined in part by different points (x,y) from the local memory, wherein the second source image is capable of separate independent display from the first source image;

processing within the fragment processor the composited image data and the additional digital image data using at least one further point compositing operation defined by one or more second codewords and state bundles, the point compositing operation comprising reading a fragment from a single (x,y) location in each of the composited image data and the additional digital image data and writing the fragment to a single (x,y) location in a composited destination image represented by composited destination image data based on one or more different one of a plurality of compositing operations prior to being combined in the composited destination image, the processing including a region compositing operation including acquiring neighboring fragment data comprising fragment data from two (x,y) locations in one of the first and second source images and writing a composited fragment to the one (x,y) location in the composited destination image; and outputting the composited destination image for display on a display device or for storage in a memory.

2. The method of claim 1, further comprising:

configuring the fragment processor to perform at least one compositing operation specified by the shader program instructions; and processing the digital image data using the fragment processor to generate the composited image data.

3. The method of claim 1, further comprising the step of storing the composited image data in the local memory.

4. The method of claim 1, wherein the fragment processor is configured to perform at least one compositing operation for each point of the first and second source images.

5. The method of claim 1, wherein the processing uses floating point precision.

6. The method of claim 1, wherein the composited image data is represented in a data format using at least 32 bits per pixel.

7. The method of claim 1, wherein a component of a pixel within the composited image data is represented in at least one of a 16 bit floating point data format, a 32 bit floating point data format, and a 64 bit floating point data format.

8. The method of claim 1, wherein the processing uses fixed point precision.

9. The method of claim 1, wherein a component of a pixel within the composited image data is represented in a fixed point data format.

10. The method of claim 9, wherein the fixed point data format uses at least 24 bits.

11. The method of claim 1, further comprising outputting the composited destination image from the combiner unit to a peripheral storage device.

12. The method of claim 11, wherein the processing of the first fragment data is performed in a single pass through a fragment processing pipeline.

13. The method of claim 1, the digital image data is read from locations in the local memory determined using texture map parameters associated with vertices.

14. The method of claim 1, wherein the processing of the digital image data uses an alpha component to generate each fragment in the composited image data.

15. The method of claim 1, wherein performing the point compositing operation comprises one of a color correction operation, an over operation, a panning operation, and a rotating operation.

16. The method of claim 1, wherein the region compositing operation comprises one of a warp operation and a blur operation.

17. A method as claimed in claim 1 wherein the digital image data is a background and the additional digital image data is an element to be composited with the background.

18. The method of claim 1 including utilizing the shader program instructions to execute a matte extraction of one of the digital image data or the additional digital image data to generate a matte image and thereafter the matte image being composited with images of the digital image data and the additional digital image data as defined by the second codewords provided by the combiner unit.

19. The method of claim 1 wherein each of the digital image data and the additional image data define an image, the images being composited to define a frame.

20. The method of claim 19 wherein each of the images is divided into tiles, the images being composited by compositing each of the corresponding tiles used to form the image.

21. A method as claimed in claim 20 wherein the fragment processor is configured by codewords to perform more than one of the compositing operations selected from the group consisting of color conversion, color differencing, color correction, panning or rotating.

22. A method as claimed in claim 1 including the further step of determining in the combiner unit whether the second codewords specify to store the composited image in graphics memory for further processing.

23. A method as claimed in claim 1 including the further step of determining whether the second codewords specify at least one more image to be composited.

24. A method as claimed in claim 23 wherein, if an additional image is to be composited, the codewords are fed back from the combiner unit to the gatekeeper unit to configure the fragment processor.

25. A method as claimed in claim 24 including the further step of feeding back combined image data from the combiner unit to a remap unit to be used in the additional image compositing operation.

* * * * *